United States Patent [19]

Jons et al.

[11] Patent Number: 5,876,602
[45] Date of Patent: Mar. 2, 1999

[54] TREATMENT OF COMPOSITE POLYAMIDE MEMBRANES TO IMPROVE PERFORMANCE

[75] Inventors: Steven D. Jons, Eden Prairie, Minn.; Kenneth J. Stutts; Michael S. Ferritto, both of Midland, Mich.; William E. Mickols, Chanhassen, Minn.

[73] Assignee: The Dow Chemical Company, Midland, Mich.

[21] Appl. No.: 964,441

[22] Filed: Nov. 4, 1997

[51] Int. Cl.$^6$ .................................................. B01D 61/00
[52] U.S. Cl. .................... 210/500.38; 210/654; 210/490; 210/506; 427/341; 427/244; 427/245
[58] Field of Search ..................................... 427/244, 245, 427/341, 342; 210/490, 500.38, 500.39, 654, 506

[56] References Cited

U.S. PATENT DOCUMENTS

| | | | |
|---|---|---|---|
| 4,277,344 | 7/1981 | Cadotte | 427/243 |
| 4,520,044 | 5/1985 | Sundet | 427/244 |
| 4,661,254 | 4/1987 | Zupancic et al. | 210/500.39 |
| 4,761,234 | 8/1988 | Uemura et al. | 210/475 |
| 4,913,816 | 4/1990 | Waite | 210/490 |
| 5,051,178 | 9/1991 | Uemura et al. | 427/245 |
| 5,693,227 | 12/1997 | Costa | 427/245 |

FOREIGN PATENT DOCUMENTS

| | | |
|---|---|---|
| 0787525 A1 | 8/1997 | European Pat. Off. . |
| 7-80259 | 3/1995 | Japan . |
| 7-80260 | 3/1995 | Japan . |
| 7-80261 | 3/1995 | Japan . |
| 7-80262 | 3/1995 | Japan . |

OTHER PUBLICATIONS

R. Singh, "Characteristics of a Chlorine–Resistant Reverse Osmosis Membrane", *Desalination*, 95, pp. 27–37 (1994) No month.

W.G. Light, H.C. Chu, & C.N. Tran, "Reverse Osmosis TFC Magnum Elements for Chlorinated/Dechlorinated Feedwater Processing", *Desalination*, 64, pp. 411–421 (1987) no month.

L.E. Applegate, C.W. Erkenbrecher, Jr., & H. Winters, "New Chloramine Process to Control Aftergrowth and Biofouling in Permasep B–10 RO Surface Seawater Plants", *Desalination*, 74, pp. 51–67 (1989) no month.

H.C. Flemming, "Mechanical Aspects of Reverse Osmosis Membrane Biofouling and Prevention", *Reverse Osmosis: Membrane Technology, Water Chemistry and Industrial Applications*, New York: Rheinhold, pp. 163–209 (1993) no month.

M. Henley, "Membranes: Greater Chlorine Tolerance can Mean Different Performance Characteristics", *Ultrapure Water*, Mar. 1996, pp. 16, 18, 20.

W.R. Adams, "The Effects of Chlorine Dioxide on Reverse Osmosis Membranes", *Desalination*, 78, pp. 439–453 (1990) no month.

T. Kawaguchi and H. Tamura, "Chlorine–Resistant Membrane for Reverse Osmosis. I. Correlation Between Chemical Structures and Chlorine Resistance of Polyamide", *J. Appl. Polym. Sci*, 29, pp. 3359–3367 (1984) no month.

J. Glater and M.R. Zachariah, "A Mechanistic Study of Halogen Interaction With Polyamide Reverse Osmosis Membranes", *ACS Symp. Ser.*, 281, pp. 345–358 (1985) Aug.

J. Glater, S–K. Hong, and M. Elimelech, "The Search for a Chlorine–Resistant Reverse Osmosis Membrane", *Desalination*, 95, pp. 325–345 (1994) no month.

S. Avlonitis, W.T. Hanbury, & T. Hodgkiess, "Chlorine Degradation of Aromatic Polyamides", *Desalination*, 85, pp. 321–334 (1992) no month.

R.E. Larson, J.E. Cadotte, & R.J. Petersen, "The FT–30 Seawater Reverse Osmosis Membrane—Element Test Results", *Desalination*, 38, pp. 473–483 (1981) no month.

S.D. Arthur, "Structure–Property Relationship in a Thin Film Composite Reverse Osmosis Membrane", *J. Membrane Science*, 46, pp. 243–260 Jun. 1988.

M.V. Biware and N.D. Ghatge, "Studies in Piperazine Containing Poly(Sulphone–amide)s for Chlorine Resistant RO Membranes", *J. Poly Science*, 2, pp. 927–932 (1994) no month.

J–Y Koo, R.J. Petersen, and J.E. Cadotte, "ESCA Characterization of Chlorine–Damaged Polyamide Reverse Osmosis Membrane", *ACS Polym. Prepr.*, 27 (2), pp. 391–392 (Sep. 1986).

T. Kawaguchi and H. Tamura, "Chlorine–Resistant Membrane for Reverse Osmosis. II. Preparation of Chlorine–Resistant Polyamide Composite Membranes", *J. Appl. Polym. Sci*, 29, pp. 3369–3379 (1984) no month.

K. Nita, K. Numata, S. Gotoh, and M. Matsui, "Application of a Chlorine–Resistant Polyamide RO Membrane With a Hollow Fiber Configuration", *Desalination* 96, 33–41 (1994) no month.

J. Glater, M.R. Zachariah, S.B. McCray, and J.W. McCutchan, "Reverse Osmosis Membrane Sensitivity to Ozone and Halogen Disinfectants", *Desalination*, 48, pp. 1–16 (1983) no month.

Hamida, A.B. et al., "Controlled Biological Fouling in Open Sea . . . ", *Disalination and Water Reuse*. vol. 6. No. 40 (1996) no month.

*Primary Examiner*—Diana Dudash

[57] ABSTRACT

Composite polyamide reverse osmosis membranes are treated with an aqueous chlorinating agent at a concentration of 200 to 10,000 ppm for a time sufficient to improve flux, lower salt passage and increase the stability to base. In a preferred embodiment the membrane is treated with heated water at temperature of 40° C. to 100° C. before being exposed to the chlorine treatment.

9 Claims, No Drawings

TREATMENT OF COMPOSITE POLYAMIDE MEMBRANES TO IMPROVE PERFORMANCE

BACKGROUND OF THE INVENTION

The present invention relates to treatment of composite polyamide reverse osmosis membranes. More specifically, it relates to the treatment of polyamide membranes, used in the purification of salt water, to enhance the flux of water through the membrane and lower the salt passage. Additionally the treatment of the membranes in accordance with the present invention improves their resistance to base exposure.

The use of reverse osmosis membranes is based on the ability of such membranes to selectively allow passage of certain components of the mixture to be separated. In the purification of salt water, such as seawater, the water is contacted with one surface of the reverse osmosis membrane under pressure to cause effective permeation of water through the membrane while minimizing the passage of the salt in the feed solution.

The efficacy of a salt water reverse osmosis membrane, although primarily determined by the combination of high flux of the water and low salt passage, also depends on its ability to withstand chemical attack from impurities or additives contained in the water. Long term exposure to chlorine is well known to cause degradation of membranes and consequent failure of such membranes in the water purification processes in which they are employed. It is also well known that the effect of chlorine on the membrane depends on the chemical structure of the membrane. This is particularly true in polyamide membranes that contain a number of different sites where chlorine can react with the polymer. The degree to which polyamide membranes are attacked depends on the particular acids and amines employed in the formation of the polyamide.

Membranes used in water purification furthermore are run under a wide range acid and base conditions, i.e., pH, and subjected to periodic cleaning under even more severe conditions. Such cleaning is conducted at high pH in order to remove biological fouling and also to free the membrane of other colloidal and particulate materials. Long-term base stability is also a very desirable property. In many applications, such as in ultra-pure water systems, it is highly desirable to operate at as high a pH as possible since at such high pH permeation of other solutes in the water, such as dissolved boron and silica containing compounds or complexes and organic carbon containing compounds, is significantly lowered.

Polyamide membranes have been widely employed in reverse osmosis processes. U.S. Pat. No. 4,277,344 ('344), the teachings of which are hereby incorporated by reference, describes a variety of membranes having a polyamide discriminating layer on a porous support. These membranes are preferably prepared by interfacial polymerization of a difunctional aromatic amine, such as meta-phenylene diamine, and a trifunctional aromatic acyl halide, such as trimesoyl chloride and 1,3,5-cyclohexane tricarbonyl chloride, optionally also containing difunctional acyl halides. Such membranes are further illustrated in U.S. Pat. Nos. 4,520,044 and 4,606,943, the teachings of which are also hereby incorporated by reference.

The treatment of membranes to enhance their performance is disclosed in a number of patents. Thus the '344 mentioned above discloses the post-treatment of the polyamide membranes with a solution of a chlorine releasing agent, e.g., hypochlorite, at a pH of 8–9, as based on the concentration of the hypochlorite used, in order to improve the performance of the membrane. U.S. Pat. No. 5,051,178 discloses the treatment of certain polyamide composite thin film membranes based on polyamides obtained by condensation involving mixtures of amines and particularly triamines, with chlorine or a chlorine generating agent at a pH of 6–13, in order to improve salt rejection and water flux. U.S. Pat. No. 4,761,234 discloses the treatment of a polyamide thin film composite membrane employing triamino benzene as one monomer with an aqueous solution containing residual chlorine at a pH of 10.3 to improve the flux of the membrane at the cost of salt rejection.

The foregoing art has demonstrated that although the treatment of a membrane with an oxidizing agent and particularly an agent releasing chlorine can improve the flux of a polyamide membrane, it is generally at the cost of some other performance characteristic of the membrane. Nothing in the art indicates recognition of the significance of the pH or basicity of any chlorine treatment on the performance characteristics of composite polyamide membranes including the stability of the resulting membrane to base. It is therefore desirable to develop treatments of polyamide membranes that result in an improvement of both flux and salt rejection. It is a further object of this invention to provide reverse osmosis membranes that can be operated at very basic conditions without suffering an increase in salt passage. It is a further object of this invention to provide membranes exhibiting superior performance with respect to impurities in water other than salt.

SUMMARY OF THE INVENTION

In accordance with the present invention, reverse osmosis composite polyamide membranes having improved flux, lower salt passage and increased stability to base are obtained by treating the polyamide membrane, before use, with a chlorine containing solution under controlled conditions of high pH, temperature, time and concentration. More specifically the objects of the present invention are accomplished when reverse osmosis composite membranes, comprising interfacially polymerized polyamides of m-phenylene diamine (MPD) and trimesoyl chloride (TMC), are treated at a pH above 10.5 with 200 ppm to 10,000 ppm of a hypochlorite ion solution at room temperature for a period of time sufficient to achieve both an increase of flux and a lowering of the salt passage, which is generally in the range of 10 minutes to five hours. Surprisingly it has been discovered that membranes treated at a pH above 10.5 exhibit much greater long term stability to base as compared to membranes treated at a lower pH and sufficiently maintain their flux and salt passage properties to be superior to untreated membranes.

DETAILED DESCRIPTION OF THE INVENTION

It has now been discovered that the performance properties of reverse osmosis membranes obtained by the interfacial polymerization of MPD and TMC, such as are commercially available from FilmTec as FT-30 membranes and elements, can be advantageously altered by controlled exposure to chlorine in the form of hypochlorite ions. Specifically, a membrane can be produced with increased flux and decreased salt passage, as compared to the untreated membrane. In addition, the so treated membrane exhibits increased stability to strong base exposure as compared to treatments at lower pH and maintains its flux and salt passage properties sufficiently at high pH to continue to be superior to the untreated membrane. This can be accomplished by contacting the membrane, after it has been formed on a porous support, whether in flat sheet or element form, with a hypochlorite solution at a pH of at least 10.5. The optimal exposure time depends on the temperature and concentration of the hypochlorite used. At room temperature, conditions which achieve the stated goals can generally be found within the ranges of 10 minutes to 5 hours and at concentrations of 200 to 10,000 ppm by weight of hypochlorite, measured as chlorine. Preferred concentrations of hypochlorite are 500 to 7,000 ppm; preferred exposure times are 30 minutes to three hours.

The performance properties (flux, salt passage, base stability) that result from the treatment, depend primarily on ppm-hrs, the product of treatment duration and concentration. However, due to multiple competitive reactions occurring during the treatment, time and concentration are not simply interchangeable in terms of their effect on the performance of the membrane, and optimum combinations must be obtained through experimentation. This is particularly true for the improvement in base stability which is more dependent on the treatment conditions.

In a preferred embodiment of the present invention the membrane is subjected to a heat treatment before being exposed to the chlorine treatment of the present invention. The membranes are heated in water at a temperature of 40° C. to 100° C. for times of 30 seconds to 24 hours. The heat treatment results in a further lowering of the salt passage and the removal of impurities contained in the membrane which otherwise may interfere in the beneficial results of the chlorine treatment. Depending on the application desired, the two treatment conditions can be adjusted within the ranges stated such that the salt passage is improved while maintaining or even improving flux over either treatment alone. The order in which the two treatments are conducted is critical since heat treating the membrane simultaneously with or subsequently to the chlorine treatment does not provide the improved results obtained by first heat treating the membrane followed by the chlorine treatment.

The polyamide membranes employed in the present invention are membranes obtained by the interfacial polymerization of MPD and TMC. Although MPD and TMC are the principal comonomers, additional diamines and diacid halides can be employed. Such diacid halides and diamines are disclosed for example in U.S. Pat. No. 4,277,377, incorporated herein by reference. Generally the additional diacid halides and diamines constitute no more than 40 percent, and preferably not more than 10 percent, of the acid and diamine component respectively of the polyamide.

Although it is not intended to limit the claimed invention, the improved results are believed to be the result of competing reactions of the chlorine with the polymer and further reactions of the chlorinated polymer chain depending on where the chlorination occurs. The mechanism of chlorination is described in the literature (See for example Glater et al, *Desalination*, 95 (1994) 324–345, and the references there cited), and hence needs not be described here. The structure of the polyamide is therefore critical in accomplishing the desired improvement in flux and salt passage and base stability.

The invention is further illustrated by the following examples, which, however are not to be construed as limiting the invention.

EXAMPLE 1

A polysulfone support containing about 60 g of water per square meter was soaked in 2.5 weight percent of MPD and reacted by interfacial polymerization with about 0.1 weight percent of TMC as described in U.S. Pat. No. 4,277,344. The membrane was then soaked in a 3.5 weight percent glycerin bath, passed through a set of rollers to remove excess fluid and oven dried at a temperature of 85° C. for about five minutes (the same membranes are also commercially available in "FilmTec"80720 elements). Duplicate coupons cut from the resulting supported reverse osmosis membrane, were immersed in an aqueous solution containing 1000 ppm of sodium hypochlorite at room temperature for two hours at various pH levels. The exposure to the hypochlorite was conducted before any reverse osmosis use of the membrane. The exposed coupons were rinsed with pure water and then tested for salt passage and flux using an aqueous solution containing 2000 ppm of salt (sodium chloride) at room temperature and at an applied pressure of 225 psi. Coupons soaked in water and not treated with the hypochlorite solution were tested for comparison purposes and found to have a flux of 33.7 gfd (gallons/square foot/day) and a salt passage of 1.64 percent. As can be seen from Table I, membranes treated at a pH of 9 and above had improved flux and lower salt passage than the original untreated membrane and better flux than the membranes treated at a lower pH.

TABLE I

| Chlorinating Treatment | Flux (gfd) | Salt Passage % |
| --- | --- | --- |
| None | 33.7 | 1.64 |
| pH 4 | 12.2; 13.42 | 0.14; 0.25 |
| pH 7 | 19.88; 20.15 | 0.35; 0.36 |
| pH 8 | 31.28; 25.30 | 0.61; 0.58 |
| pH 9 | 37.37; 36.72 | 0.75; 0.82 |
| pH 10 | 42.69; 42.40 | 0.87; 0.80 |
| pH 11 | 48.37; 45.99 | 1.03; 1.01 |

EXAMPLE 2

Coupons of the starting reverse osmosis membrane of Example 1 were immersed in a solution of 1000 ppm of hypochlorite at a pH of 12 for a period of an hour and compared to an untreated membrane. All coupons were rinsed well and soaked for 1.5 hours in either 1.5 molar hydrochloric acid, 0.1 molar sodium hydroxide or water at a pH of 7. The resulting coupons were then tested for flux and salt passage using a 2000 ppm salt solution at an applied pressure of 225 psi. The water soaked membrane exhibited a flux of 30.4 gfd and a salt passage of 1.61 percent. The hypochlorite treated membrane exhibited a flux of 36.5 gfd and a salt passage of 0.75 percent. As can be seen from the data below in Table II, the hypochlorite membrane maintained its improved flux and salt passage even with the acid and base exposure.

TABLE II

| Chlorinating Treatment | | Acid Soak | Base Soak | Water Soak |
| --- | --- | --- | --- | --- |
| None | Flux (gfd) | 29.9 | 30.9 | 30.4 |
|  | Salt Passage % | 1.44 | 1.46 | 1.61 |
| pH 12 | Flux (gfd) | 36.0 | 37.5 | 36.5 |
|  | Salt Passage % | 0.74 | 0.93 | 0.75 |

EXAMPLE 3

Coupons of the starting reverse osmosis membrane of Example 1 were immersed in a solution of 1000 ppm of hypochlorite for one hour at pH values of 7 to 13. The coupons were then exposed to 0.1M sodium hydroxide for 16 hours. The coupons were rinsed and left in water for 5 hours before testing at 225 psi applied pressure using a 2000 ppm salt solution. As demonstrated by Table III below, only membranes treated at a pH of 10.5 or above continued to have improved flux and lower salt passage compared to the untreated membrane.

TABLE III

| Chlorine Treatment | Flux (gfd) | Salt Passage % |
|---|---|---|
| none | 32.1 | 1,65 |
| pH 7 | 95.923 | 4.15 |
| pH 9 | 62.819 | 2.11 |
| pH 10 | 61.771 | 2.09 |
| pH 11 | 47.677 | 1.49 |
| pH 12 | 42.374 | 1.00 |
| pH 13 | 41.733 | 0.995 |

EXAMPLE 4

Commercially available "FilmTec" tap water reverse osmosis elements were exposed to 1000 ppm of hypochlorite solution at a pH of 12 for the different times shown in the table below. All elements were tested at 225 psi applied pressure using a 2000 ppm salt solution before and after treatment. On an average the elements had a flux of 322 gallons per day (gpd) and a salt passage of 0.5 percent before treatment. A minor increase in flux was also observed when the untreated membranes were retested. In all instances the salt passage was lowered nominally as a result of the treatment. As shown in the table the increment by which flux increased, increased significantly with time of treatment.

TABLE IV

| Treatment time (hrs) | 0 | 0.5 | 1 | 4 | 8 |
|---|---|---|---|---|---|
| Flux Increase (gallons/day) | 10.3, 14.4 | 71.9 | 114.1 | 146.7 | 202.5 |

EXAMPLE 5

Coupons of reverse osmosis membranes obtained by the interfacial polymerization of TMC and MPD on a porous polysulfone support, commercially available as the membranes in "FilmTec"99755 elements, were immersed in water at a temperature 60° C. for one hour. Some of the coupons were then immersed in 1000 ppm hypochlorite solution at a pH of 12 for a period of one hour. Coupons untreated, subjected only to the heat treatment, subjected only to the hypochlorite treatment and subjected to both were compared as to flux and salt passage by testing at an applied pressure of 225 psi using a 2000 ppm salt solution. As can be seen from Table IV below the combined heat and hypochlorite treatment improved the flux and lowered the salt passage more than either treatment alone.

TABLE V

| Treatment | Flux (gfd) | Salt Passage % |
|---|---|---|
| Untreated | 47.5 | 1.78 |
| Heat treated | 35.9 | 1.3 |
| Chlorine treated | 48.8 | 0.8 |
| Heat + chlorine treated | 52.4 | 0.69 |

EXAMPLE 6

Coupons of the reverse osmosis membrane of Example 5 were treated at room temperature with hypochlorite at pH 12 for times and at concentrations shown in the table below. Some of the coupons were then subjected to 0.1M sodium hydroxide for 62 hours. All coupons were then tested with 2000 ppm of salt at 225 psi applied pressure. As can be seen from the data coupons not exposed to the base all had similar flux and salt passage for the same ppm-hours. Coupons exposed to base showed increase in both flux and salt passage.

TABLE VI

| Time and Conc. | Base Treatment | Ppm/hrs | Flux (gfd) | Salt Pass. % |
|---|---|---|---|---|
| untreated | no | 0 | 45.43 | 1.64 |
| 1 hour, 4000 ppm | no | 4000 | 55.99 | 0.56 |
| 2 hour, 2000 ppm | no | 4000 | 57.22 | 0.54 |
| 1 hour, 4000 ppm | yes | 4000 | 73.85 | 1.47 |
| 2 hour, 2000 ppm | yes | 4000 | 74.57 | 1.24 |
| 1 hour, 10000 ppm | no | 10000 | 58.80 | 0.74 |
| 5 hour, 2000 ppm | no | 10000 | 62.27 | 0.74 |

The membranes of the present invention find particular utility in the production of potable water from brackish water as well as in the purification of water to produce ultra pure water. Another advantage of the treated membranes of the present invention is their stability at high pH, which allows for repetitive cleaning of the membrane during use.

What is claimed is:

1. A process of producing a composite membrane on a microporous support comprising the steps of (a) reacting meta-phenylene diamine and trimesoyl chloride by interfacial polymerization on a porous support to form a composite membrane and (b) exposing said composite membrane to a solution containing from 200 to 10,000 ppm of a hypochlorite ion at a pH of at least 10.5 for a time sufficient to obtain a membrane having both improved flux and lower salt passage as compared to the same untreated membrane.

2. The process of claim 1 wherein the chlorine containing solution is a solution of sodium hypochlorite.

3. The process of claim 1 wherein the membrane is heat-treated by immersion in water at a temperature of 40° C. to 100° C. before contacting the membrane with the chlorine-containing solution.

4. The process of claim 1 wherein the treatment is conducted at a pH of 10.5 to 13, the chlorine concentration is from 500 to 7000 ppm and the exposure time is from 30 minutes to 3 hours.

5. The process of claim 1 wherein the membrane is obtained by the interfacial polymerization of meta-phenylene diamine and trimesoyl chloride as the sole monomers.

6. The membrane of claim 1.

7. The membrane of claim 6 wherein the polyamide consists essentially of the interfacial reaction product of meta-phenylene diamine and trimesoyl chloride.

8. The membrane of claim 5 wherein the composite polyamide was exposed to a solution containing from 500 to 7,000 ppm of hypochlorite ions at room temperature for a time sufficient to improve flux and lower salt passage as compared to the untreated membrane.

9. The membrane of claim 3.

\* \* \* \* \*